United States Patent
Williams, Jr.

(10) Patent No.: US 7,207,135 B1
(45) Date of Patent: *Apr. 24, 2007

(54) AUDIO FISHING LURE SYSTEM FOR ATTRACTING SPECIES SPECIFIC FISH

(76) Inventor: Jimmie D. Williams, Jr., 2357 E. 14th St., Greenville, NC (US) 27858

(*) Notice: Subject to any disclaimer, the term of this patent is extended or adjusted under 35 U.S.C. 154(b) by 0 days.

This patent is subject to a terminal disclaimer.

(21) Appl. No.: 11/307,903

(22) Filed: Feb. 27, 2006

Related U.S. Application Data

(63) Continuation-in-part of application No. 10/834,958, filed on Apr. 30, 2004, now Pat. No. 7,062,878.

(51) Int. Cl.
*A01K 85/01* (2006.01)

(52) U.S. Cl. .......................... 43/42.31; 43/17.1
(58) Field of Classification Search ............... 43/42.31, 43/4.5, 19.2, 17.1, 25
See application file for complete search history.

(56) References Cited

U.S. PATENT DOCUMENTS

| | | | |
|---|---|---|---|
| 2,583,660 A | 1/1952 | Moore | 43/44.99 |
| 2,624,145 A | 1/1953 | Wehn | 43/17.1 |
| 2,624,146 A | 1/1953 | Kahle | 43/43.16 |
| 2,977,705 A | 4/1961 | Busnel | 43/17.1 |
| 3,789,534 A | 2/1974 | Yankaitis | 43/19.2 |
| 4,700,501 A | 10/1987 | Bryan | 43/19.2 |
| 4,763,434 A | 8/1988 | Horneff | 43/18.1 |
| 4,805,339 A | 2/1989 | Fuentes et al. | 43/42.31 |
| 5,046,278 A | 9/1991 | Szilagyi et al. | 43/17.1 |
| 5,177,891 A | 1/1993 | Holt | 43/17.1 |
| 5,237,771 A | 8/1993 | Watson et al. | 43/42.31 |
| 5,253,445 A * | 10/1993 | Spoonemore | 43/17 |
| 5,331,760 A | 7/1994 | DuMont | 43/17.1 |
| 5,511,335 A | 4/1996 | Langer | 43/4 |
| 5,697,182 A | 12/1997 | Rodgers | 43/17.1 |
| 6,779,291 B2 | 8/2004 | Arcand | 43/4.5 |

* cited by examiner

*Primary Examiner*—Kimberly S. Smith
(74) *Attorney, Agent, or Firm*—Mills Law Firm PLLC

(57) ABSTRACT

An audio fishing lure system for attracting fish using preselected audio content includes a fishing pole, a fishing line, a lure or hook, an audio source, an aural encoder, and an underwater transducer. Sound reproduced by the audio source, such as a radio, cassette player, or digital playback device, is electrically communicated to the encoder, which correspondingly generates sound waves that modulate the fishing line. The fishing line is optimized to serve as a transmission line. The audio information propagates along the fishing line, into the water, and to the transducer, where the mechanical waves are transformed to sound waves and transmitted into the water, thereby delivering sound to the region about the bait and attracting fish responsive to such content. Preferably, the audio source is provided with a selectable format of audio recordings of bait species having demonstrated or empirical attractiveness to target fish species. Accordingly, the angler may accordingly a recording best suited for the target fish specie of interest.

10 Claims, 7 Drawing Sheets

AUDIO FISHING LURE SYSTEM FOR ATTRACTING SPECIES SPECIFIC FISH

RELATED APPLICATION

This application is a continuation-in-part application of U.S. Ser. No. 10/834,958 filed on Apr. 30, 2004 now U.S. Pat. No. 7,062,878.

FIELD OF THE INVENTION

The present invention relates to devices for attracting fish and, in particular, an audio fishing lure system that transmits preselected sound waves into water for attracting species specific fish to a lure or bait.

BACKGROUND OF THE INVENTION

Since the beginning of time, people have used all sorts of apparatuses and methods for catching fish. Stone-agers used gorges made of bone, flint, or wood as fishing implements. There is evidence to suggest that the ancient Egyptians used rods for fishing. Rods with reels are known to have existed by the 16th Century. Anglers have always sought to improve their efficiency in catching fish whether by necessity, when the catch is for subsistence, or for fun, when the catch is for sport.

The addition of a reel to a fishing pole dramatically alters the fishing event. The reel affords the angler the opportunity to immediately store more fishing line that allows the bait or lure to be cast into distant locations where fish may be hiding. The ability to reel the line allows the angler to better control the movement and position of the bait. Reels may be spinning reels, spin casting reels, or fly reels, each suitable for its own application.

Volumes have been written on techniques and devices to help an angler catch more fish. There are numerous publications on fish philosophy that attempt to teach the reader how to think like a fish. What kind of food does a fish prefer? Where is a fish likely to hide? What sort of look or motion to the bait catches a fish's attention? Will a fish be repelled by the exposed barbed end of a hook? Will the species of fish sought prefer minnows, grasshoppers, crickets, crawfish, shrimp, or worms as bait?

For example, well-known large mouth bass idiosyncrasies are they are always hungry, curious, aggressive, easily teased, territorial, like shallow water, object to bright sunlight, prefer running water, and responsive to sound. They are responsive to jigs, spoons, spinners, buzzbait, and spinnerbait. They can be caught with worms, minnows, frogs, small fish, and land and earth insects. Such fish are attracted to certain sounds more so than others.

As the art of fishing has developed, so has the art of lures. A lure serves as artificial bait. The lure industry has developed to the point that there are now thousands of options available to anglers, including spoons, chuggers, jerk baits, stick baits, plugs, and chuggers. Advantageous use of a lure requires a determination of the optimum depth to run the lure, a lure's movement, speed, size, shape, color, smell, taste, and reflectivity.

Equally aggressive inventive energy has been used to determine the optimum fishing line. The choice of the optimum fishing line includes a determination of the necessary strength or test, the rigidity of the line, and other equally important characteristics such as thickness, pliability, color, durability, and material. The optimum pole to use in a fishing event is characterized by length, flexibility, resilience, thickness, and portability. Rods are optimized for saltwater fishing, stream fishing, and pond fishing. An angler determined to catch a specific species of fish will certainly have a favorite bait or lure, a line, pole, and reel combination.

The techniques involved in catching a particular size or species of fish are as varied as the combinations of fishing equipment. To secure a particular catch, the angler must understand fish psychology to know where to fish, when to fish, the type of bait or lure, line, pole, and reel to use, the type of motion to communicate to the bait, and even whether to be potentially visible to the catch.

As examples, light, sound, vibration, and scent have been proposed as fish attractors proximate real and artificial bait. U.S. Pat. No. 2,583,660 to Moore provides a device for intermittently supplying liquid lure proximate a fish hook to create a trail that fish will hopefully follow. U.S. Pat. No. 4,763,434 to Horneff provides a fishing pole with a pump assembly and an output tube that transports liquid fish scent from a container to the end of the pole, where it deposits on the fishing line and travels downwardly towards the hook.

U.S. Pat. No. 2,624,146 to Wehn shows a fishing device comprising a pole and reel combination with a vibrating reed sound producing device. Sound is generated by an electromagnetically operated vibrator mechanism consisting of a pair of coils operative with an armature and energized by a dry cell battery and is conducted along a fishing line to the hook. The character of the sound or noise generated by the device is adjustable with a thumbscrew. The range and variety of sounds are limited by the coil-armature combination.

U.S. Pat. No. 2,977,705 attempts to improve on acoustic attraction of fish by proposing a steep wave front acoustical source as an audio source. Transient vibrations are produced by the intermittent striking of a resilient metal ribbon on a corrugated wheel. Water is accelerated though the housing containing the device by manipulation of the fishing line. As water flows through a protective screen into the confines of the device, a propeller rotates a drive shaft that rotates the corrugated wheel. The tonal characteristics of the transient vibrations are limited and will similarly limit the species of fish that may be attracted.

U.S. Pat. No. 5,046,278 proposes an improved fish caller having an underwater loudspeaker for generating an acoustical signal for attracting fish. The audio source is a pseudo-random noise generator that is pseudo-randomly enabled and disabled and conditioned with upper and lower bandpass filters thought to create a sound similar to that generated during feeding of predatory fish.

U.S. Pat. No. 4,805,339 to Fuentes et al. discloses a sonic, cylindrically shaped fishing lure with electrical circuitry, an energy source, and a sonic transducer. Sound is produced by a coil activator vibrating first and second vibrating plates. The spectrum of sounds produced is limited and, therefore, limits the number of species of fish that may be attracted. A similar device is proposed in U.S. Pat. No. 5,177,891 to Holt in which acoustical signatures attractive to fish are recorded and then digitally stored in circuitry contained in a lure housing. An analog signal is produced and then amplified by an amplifier and delivered to an output transducer proximate the bait. The analog and digital circuitry, power source, and transducer are located within the housing. A similar device packaged as a surface float is disclosed is U.S. Pat. No. 5,331,760 to DuMont.

U.S. Pat. No. 5,511,335 to Langer proposes a multifunctional sensor assembly that includes a sound module, such as a miniature speaker, that emits sounds that attract fish or mimic sounds of bait. The audio signal is transmitted to the sensor assembly along an electrically conductive fishing line. The electrical-to-mechanical energy conversion necessary to cause sound to be emitted from the sensor occurs within the submerged sensor.

U.S. Pat. No. 5,697,182 to Rodgers discloses a self-contained fishing lure with active circuitry responsive to movement such that an output signal is produced to power a light, an underwater speaker, or a pair of field effect probes. The circuitry is powered by a co-located battery. U.S. Pat. No. 5,237,771 to Watson et al. proposes a battery powered fishing lure with a water-resistant housing containing a power oscillator circuit operating a coil and a noise-making plunger. The oscillator generates preselected patterned electrical signals intended to attract fish.

While the science of attracting fish with particularized sound is well established, there is a need for a low-cost device for producing sound proximate a lure attractive to fish in which the variety of sounds produced is wide.

SUMMARY OF THE INVENTION

The present invention provides an audio fishing lure for attracting fish using preselected audio content includes a fishing pole, a fishing line, a lure or hook, an audio source, an aural encoder, and an underwater transducer. Sound reproduced by the audio source, such as a radio, cassette player, or digital playback device, is electrically communicated to the encoder, which correspondingly generates sound waves that modulate the fishing line. The fishing line is optimized to serve as a transmission line. The audio information propagates along the fishing line, into the water, and to the transducer, where the mechanical waves are transformed to sound waves and transmitted into the water, thereby delivering sound to the region about the bait and attracting fish responsive to such content.

The present invention is novel and useful in that the fisherman essentially pre-selects the species of target fish by pre-selecting the audio source material to be used during the fishing event in conjunction with the present invention. It has been empirically established that certain fish species are attracted to certain audio program materials. Therefore, for example, if the fisherman is attempting to catch large mouth bass, a predetermined style of sound, music, or noise is selected and is used as the modulating source for the line fed through the encoder. If the fisherman is attempting to catch brim, a predetermined style of sound, music, or noise corresponding to the preferences of that species of fish is chosen. Because of the limitless variety of audio source materials available, the fisherman is able to finely hone the fishing experience and attract the exact fish species sought through experience and experimentation. Preferably, the audio source is provided with a selectable format of audio recordings of bait species having demonstrated or empirical attractiveness to target fish species. Accordingly, the angler may accordingly select in a well known manner a recording best suited for the target fish specie of interest. Suitable sounds recordings of bait species, for example, include shrimp, oyster toad fish, croaker, and winged insects such as flies. Shrimp in particular are effective for a wide range of target fish species.

Accordingly, it is an object of the present invention to provide an audio fishing lure system including an aural decoder that receives and emits acoustical signals attractive to fish wherein the audio content transmitted to the decoder is selected by the fisherman to attract a specific fish species.

Another object of the invention is to provide an audio fishing lure system that is low cost.

Yet another object of the invention is to provide an audio fishing lure system that allows the transmission of audio from a variety of readily available audio sources.

A further object of the invention is to provide an audio fishing lure system wherein audio recordings of bait species having demonstrated or empirical attractiveness to target fish species are transmitted to the water.

BRIEF DESCRIPTION OF THE DRAWINGS

The above and other objects and features of the invention will become apparent upon reading the following description taken in conjunction with the accompanying drawings in which.

DETAILED DESCRIPTION OF THE PREFERRED EMBODIMENTS

Figure 1:
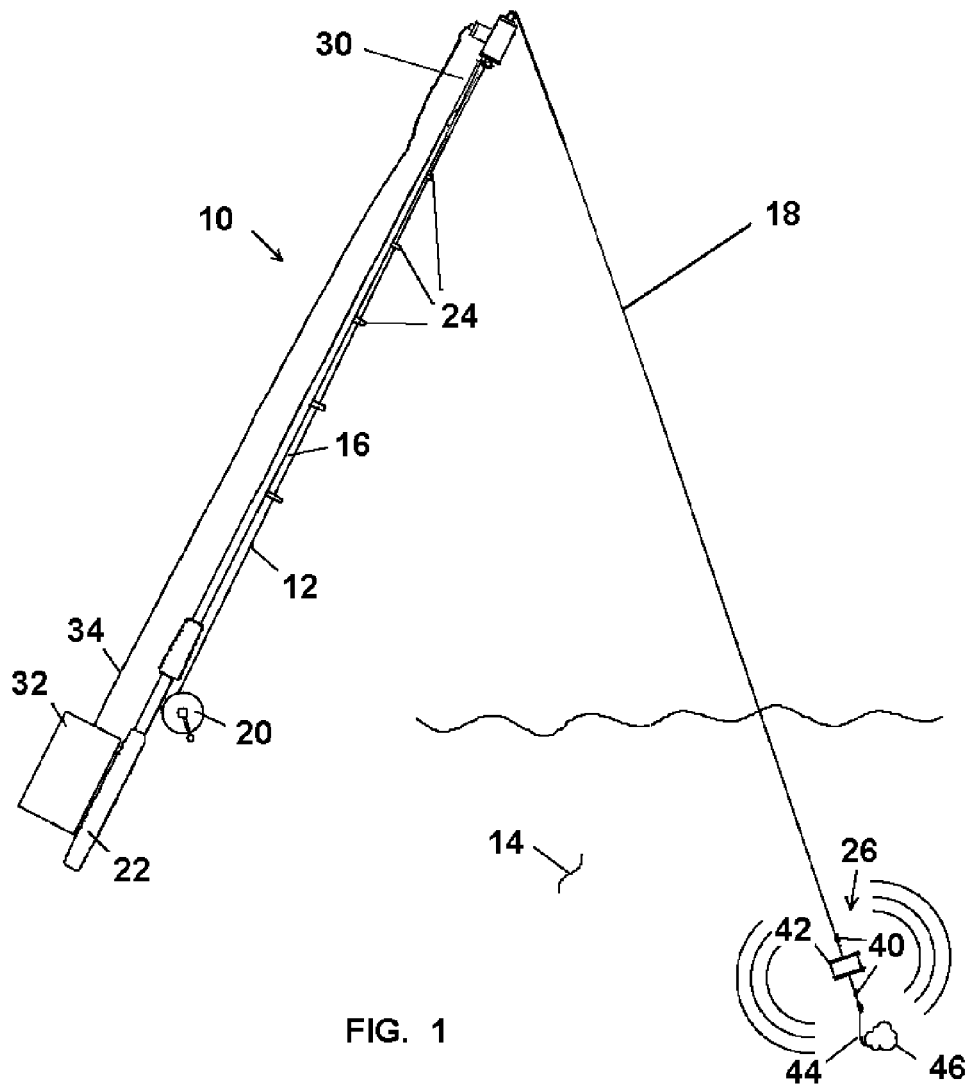
FIG. 1 is a view of the audio fishing lure system disposed about a water environment in accordance with a preferred embodiment of the present invention.

Referring to the drawings for the purpose of describing the preferred embodiment and not for limiting same, FIG. 1 illustrates the audio fishing lure system 10 integrated with a fishing rod 12 for transmitting a selected acoustical content attractive to target species in a water environment 14. The fishing rod 12 is conventional in construction wherein a fishing pole 16 deploys a fishing line 18 from a reel 20 adjacent a handle 22 through eyelets 24 to position a bait-specific lure assembly 26 into the water environment 14.

The reel 20 may be of any type, including a spinner, spin, and fly. If no reel is needed for the style of fishing performed during the fishing event, the line 18 may be secured to the fishing pole 16 in the vicinity of handle 22 with a knot or other securing means. The line 18 is held adjacent the fishing pole 16 by conventional eyelets 24 through which the line 18 passes. A lure assembly 26 is attached at the terminal end of the line 18.

The audio fishing lure system 10 comprises an encoder 30 positioned at the end of the fishing pole 16, aligned and affixed with the end eyelet 24, an audio source 32 carried on the handle 22 or alternatively by the fisherman, and a cable 34 operatively interconnecting the audio source 32 and the encoder 30. The cable 34 may be periodically attached along the fishing pole 16.

The encoder 30 is disposed on the pole 16 such that line 18 passes through it. The cable 34 is a standard two-conductor wire suitable for carrying audio signals. The audio source 32 is any suitable sound generating device such as a cassette tape player, compact disk player, digital audio player, computer, or the like. The audio source 32 is provided with a selectable format of audio recordings of bait species having demonstrated or empirical attractiveness to target fish species. The angler may accordingly select in a well known manner a recording best suited for the target fish specie of interest.

The lure assembly 26 includes a tackle 40 which is connected with transducer 42. A hook 44 carrying a bait 46 connects through the tackle 40 at the opposite side of transducer 42.

Figure 2:
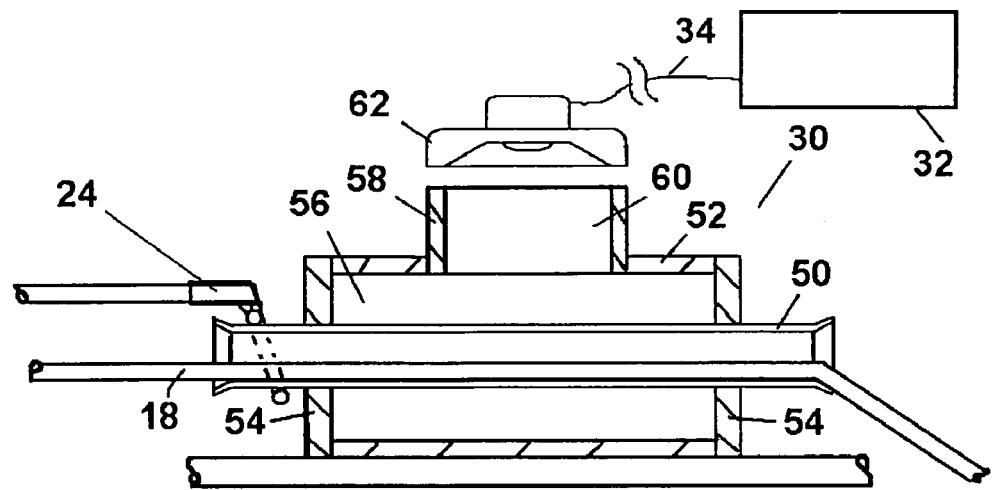
FIG. 2 is a side cross sectional view of the transducer with the transmission line disposed within the waveguide.
Figure 3:
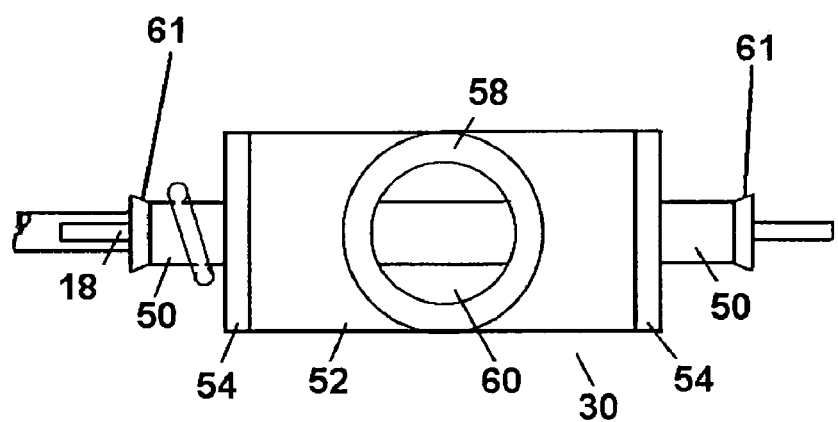
FIG. 3 is a top view of the encoder with the speaker removed.

Referring to FIGS. 2 and 3, the encoder 30 includes a cylindrical waveguide 50 coaxially carried on a cylindrical housing 52 by end caps 54 and defining therebetween an annular acoustical chamber 56. The inner end of the waveguide 50 extends through and is affixed to the end eyelet on the pole with the outer end projecting therebeyond. Accordingly, the line 18 is mechanically acoustically coupled against the inner surface of the waveguide 50. A cylindrical transmission tube 58 extends through an opening in the housing normal to the waveguide 50 providing an acoustical duct 60 communicating with the acoustical chamber 56. The waveguide 50 is provided with flared ends 61 to prevent abrasion of the line 18. A speaker 62 attaches coaxially with the open end of tube 58 such that sound waves emanating from the speaker 62 travel through the duct 60 into the acoustical chamber 56 colliding with and creating a pressure wave about the waveguide 50. The pressure wave causes the waveguide 50 to vibrate at a rate and a magnitude corresponding with the frequency and the amplitude of the audio signal supplied by the audio source 32 through the cable 34 to the speaker 62. The line 18 is closely coupled with the waveguide 50 such that the mechanical vibrations in the waveguide are transferred to the line 18 without subsequent dampening. Electrical energy produced by the audio source 32 is converted to acoustical energy by the speaker 62 and then converted to mechanical energy at the waveguide 50 that is finally coupled into the line 18. As such, the audio signal provided by the audio source 32 modulates the line 18, which serves as a transmission line to communicate with the transducer 42.

The line 18 serves as a transmission line to communicate the mechanical energy from the encoder 30 to the transducer 42. A suitable line is a conventional 80 pound test 15 pound diameter line that provides maximum strength, high sensitivity, and minimal stretch in a small diameter. The line used in the preferred embodiment is SPIDERLINE, manufactured by Pure Fishing of Sprit Lake, Iowa, although other fishing lines, preferably polyfilament woven lines can be used with similar results. Monofilament lines tend to exhibit greater elongation under loading thereby dampening the acoustical transmissions.

FIG. 3 illustrates the encoder when viewed from the top with speaker 62 removed.

Figure 4:
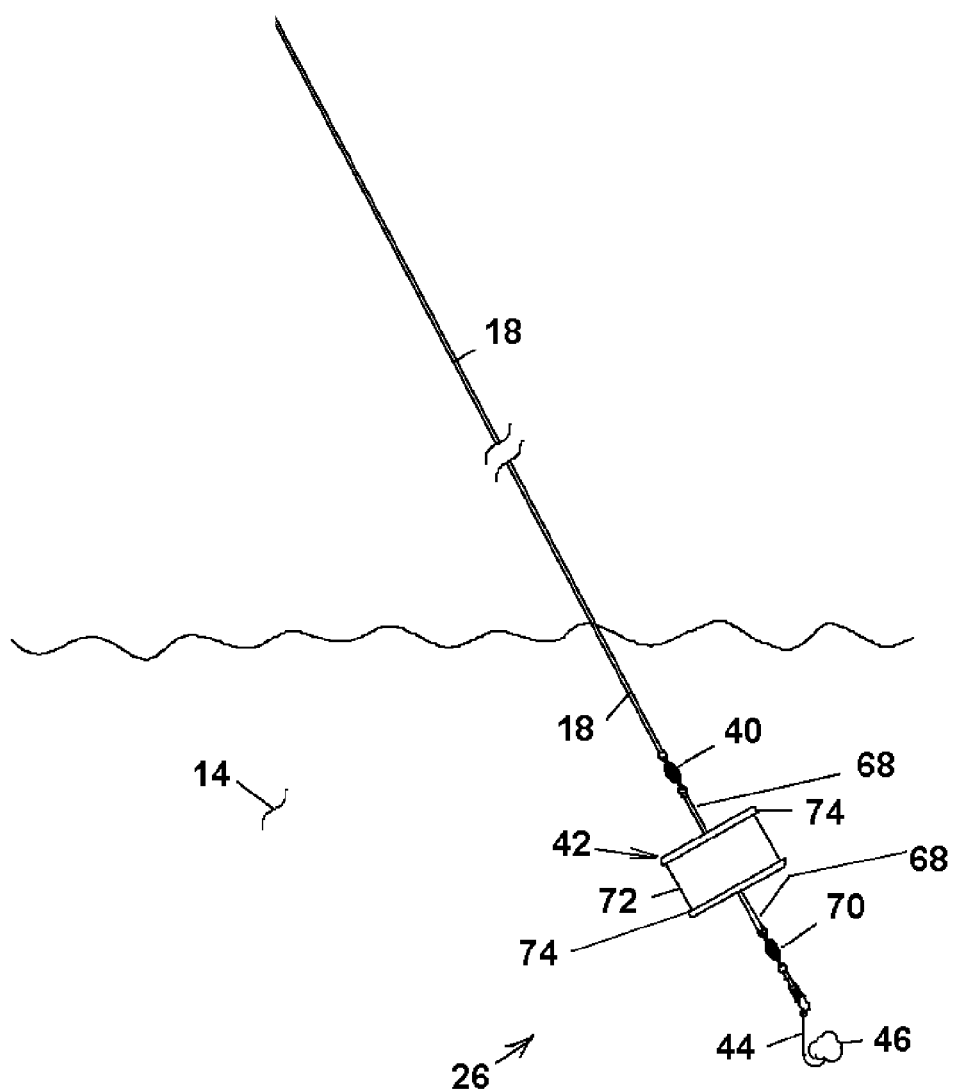
FIG. 4 is an expanded view of the audio fishing lure system illustrating the transducer, the fishing line, and the tackle disposed within the water environment.

FIG. 4 shows an environmental view of the fishing line 18 extending from the encoder at the end of the rod into the water environment 14 and terminating with the lure assembly 26. The expanded view of the lure assembly 26 illustrates tackle 40 affixed to the end of the line 18. The opposite end of tackle 40 attaches to a second line 68 that extends through the transducer 42 and is attached to a second tackle 70.

Figure 5:
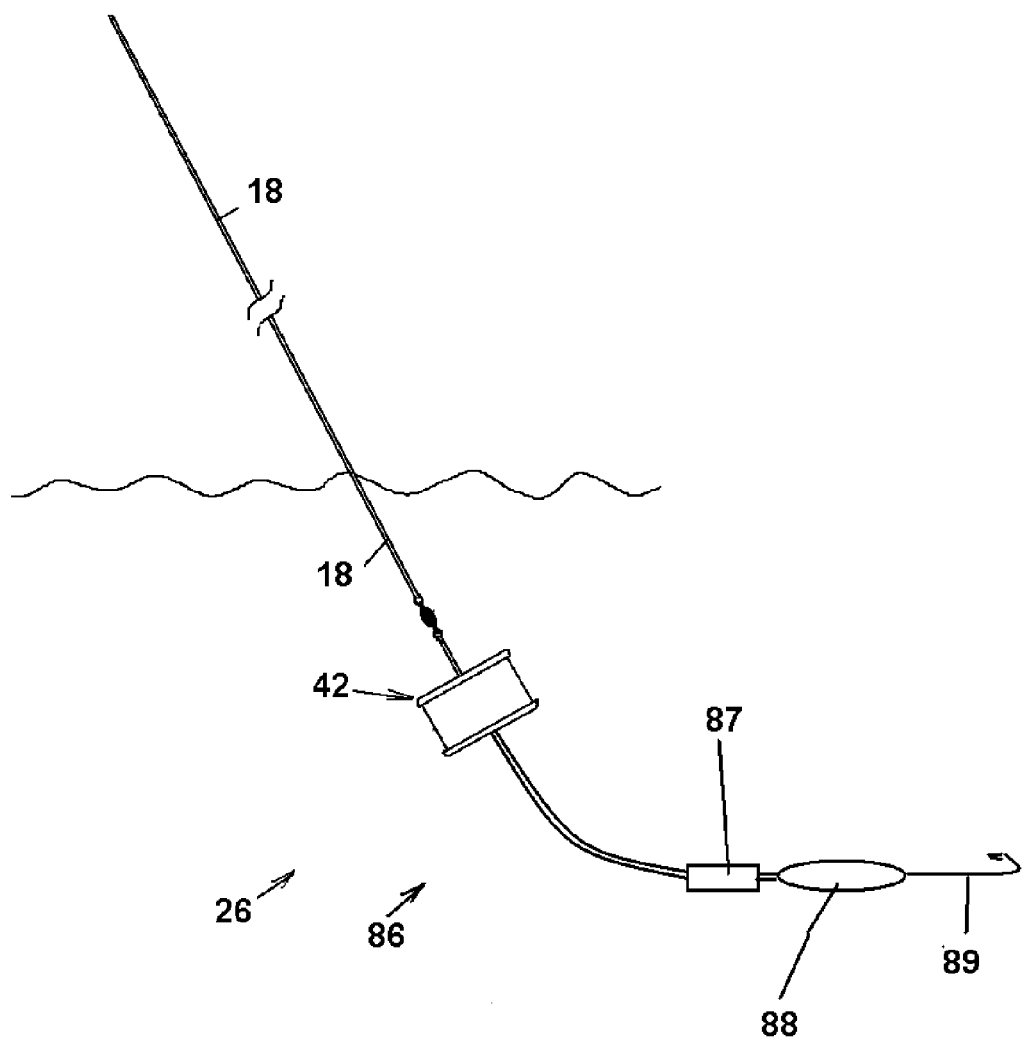
FIG. 5 is a view similar to FIG. 4 showing a fishing line and transducer provided with an artificial lure.
Figure 6:
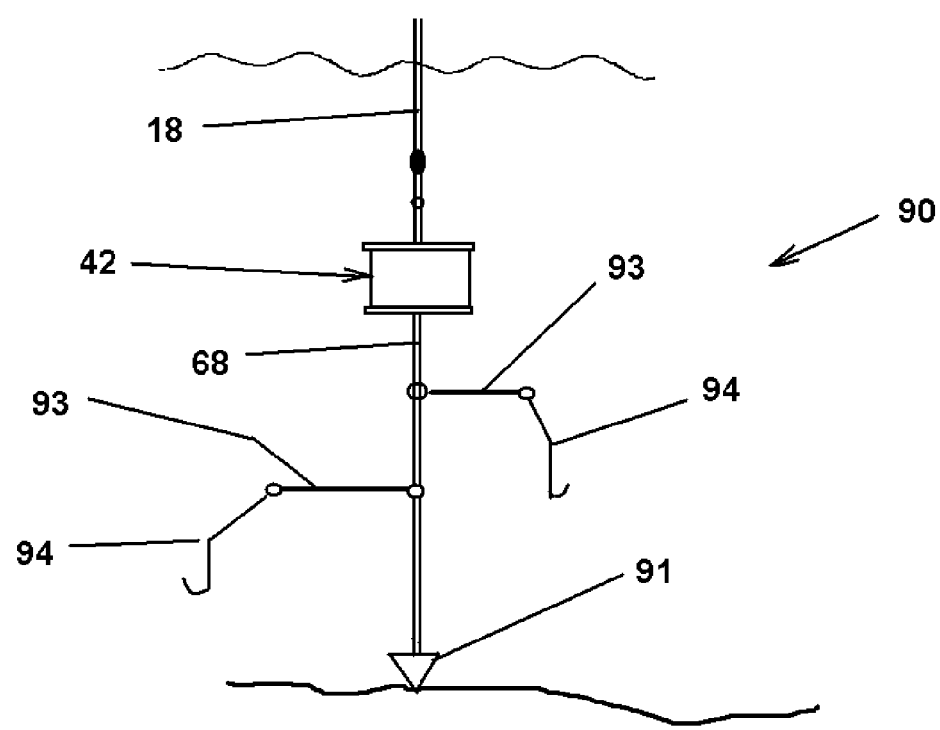
FIG. 6 is a view similar to FIG. 4 showing a fishing line and transducer provided with a bottom rig for salt water fishing.
Figure 7:
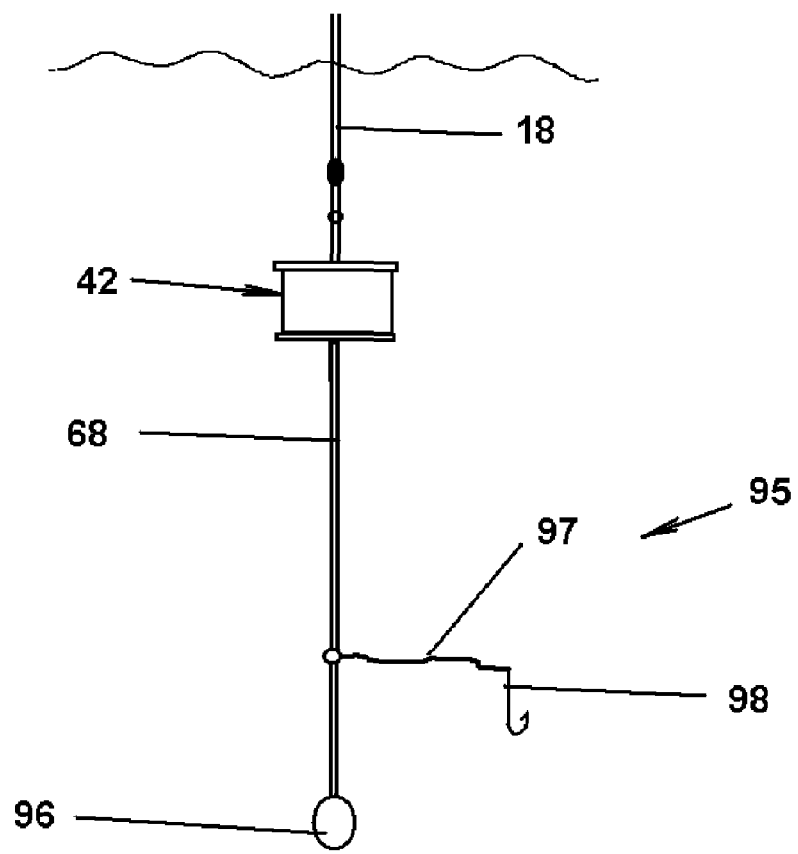
FIG. 7 is a view similar to FIG. 4 showing the fishing line and transducer provided with a rig for fresh water fishing.
Figure 8:
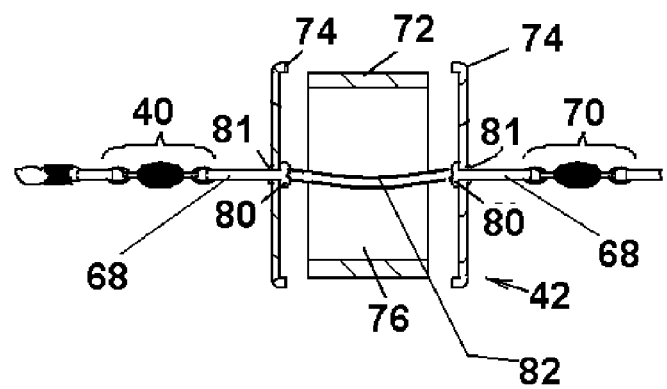
FIG. 8 is an exploded, side cross sectional view of the transducer with the fishing line and tackle disposed therein.
Figure 9:
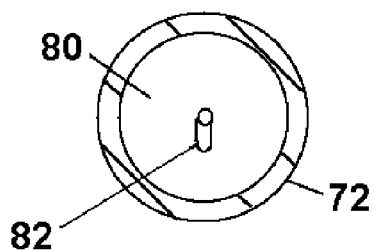
FIG. 9 is a cross sectional view of the cylinder of the transducer.
Figure 10:
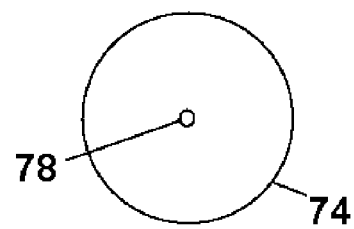
FIG. 10 is a top view of the diaphragm.

Referring additionally to FIGS. 5 through 7, the transducer 42 includes a cylinder 72 having diaphragms 74 fixedly attached at the ends thereof and forming a sealed cavity 76. As shown in FIG. 8, the second line extends through apertures 78 in the diaphragms 74. The second line 68 includes knots 80 adjacent the interior surfaces of the diaphragms 74 and defining therebetween a safety line section 82. As shown in FIGS. 1 and 4, the combined weight of the transducer 42 and the hook 44 are sufficient to submerge the transducer and maintain the line in a taut condition for transmission. In the event of a fish strike that creates a loading between the hook 44 and the line 18 exceeding the break strength of the interface between the cylinder and the diaphragms, the safety line section 82 will permit landing of the fish. Thereafter, the transducer may be repaired or replaced.

The transducer 42 converts mechanical energy carried along the line 18 into acoustical energy transmitted into the water environment 14. The cylinder 72 is made from a tubing material, such as plastic or metal. The diaphragms 74 are circular and generally planar and are made from metal or plastic. The apertures 78 have approximately the same diameter as the second line 68 thereby permitting the line 18 to pass therethrough. After the line 68 is assembled and terminated with the knot 80 or other suitable retaining means, a seal 81 is applied at the intersection of the line 68 and the apertures 78 to increase the transmission coefficient for transmission of the mechanical energy propagating along the line 18 to the diaphragms 74 and to prevent water penetration into the cavity 76. A suitable adhesive (not shown) is applied between the intersection of the periphery of the diaphragms 74 and the cylinder 72 to form watertight junctions.

In use, the angler selects an audio recording at the acoustic source 32 best suited for the target fish specie. The lure assembly 26 is conventionally cast to a select location. Thereafter, the mechanical energy as vibrations originating from the output of the music source 32 are carried along line 18 and transmitted to the transducer 42 causing an acoustic vibration in the line 18 at a rate and character replicating with the audio content preselected by the angler. The induced vibration of the transducer 42 creates sound pressure waves in the water environment 14 that are attractive to target species.

The transducer 42 and lure assembly 26 may be provided in various conventional riggings. FIG. 4 illustrates a general rigging for casting of the lure assembly with or without reeling. FIG. 5 illustrates a rigging 86 wherein the line 18 includes a weight 87 intermediate an artificial lure 88 having a tail hook 89 for use with trolling or reeling. FIG. 6 illustrates a bottom rig 90 for salt water fishing wherein a weight 91 at the end of the line 68 rests on the water bottom, and is provided with leaders 93 terminating with bait hooks 94. FIG. 7 illustrates a rig 95 for fresh water fishing wherein a weight 96 is provided at the end of the line 18 with a leader 97 terminating with a bait hook 98.

In each and other fishing modes, the angler may select other suitable recordings for the target fish, or select an alternative target fish and complementary recording. Testing has shown that bait species recordings are particularly effective. Such recordings are readily available from Internet sites, such as Scienad Acoustics Research Team at East Carolina University. Examples of recording demonstrating attractiveness to target species include shrimp for a variety of fish, particularly effective with flounder, nuisance fish such as oyster toad fish or pin fish for readily caught, generally non-edible fish (still of interest for young anglers), distressed croaker for predatory fish including shark and albacore, distressed thrashing minnows for larger fresh water fish and winged insects such as flies for bass. Artificially produced sounds replicating the natural sounds may be employed Testing has demonstrated that fish attracted by a bait species sound, at attracted to the sound, and will take the bait even if the same is not the recorded species. Flounder, not prone to eating dead shrimp, will bite on dead shrimp when drawn to the live shrimp recording. The oyster toad fish was very effective in attracting its own species and were caught in abundance at sites where the species had previously been rarely caught.

Actual testing has demonstrated that non-professional anglers using the invention and fishing adjacent professional anglers are able to catch fish in comparable quantities in a greater variety of species. Moreover, the invention produced the first caught fish over ninety percent of the time. It is not known whether the invention indirectly contributed to the catch by the other angler by attracting the fish to the general area of the sound. In head to head fishing, the invention generally caught the largest fish of the day, as well as substantially more juvenile fish. Further, fish have been caught on every outing, making the invention popular with young children for whom the event catching is of utmost satisfaction.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed is:

1. An audio fishing lure system for attracting a target fish species in a surrounding water environment comprising:
    a fishing pole terminating at an outer end with a tubular waveguide extending from said outer end;
    an encoder operatively coupled to said waveguide;
    a fishing line extending through said waveguide with an outer end disposed in the water environment;
    audio modulation means operatively associated with said encoder for transferring sound pressure waves to said fishing line at said waveguide;
    an audio source electrically coupled to said encoder providing user selected audio content to said audio modulation means and transmitting mechanical vibrations in accordance with said audio content to said fishing line at said waveguide wherein said audio content is an audio recording of a bait species having an attractiveness to the target fish species;
    a transducer fixedly connected to said outer end of said fishing line for receiving said vibrations and outputting an audio transmission replicating audio recording of said bait species whereby said vibrations are transmitted by said fishing line and converted to audio pressure waves replicating said audio recording of said bait species and emitted into the surrounding water environment; and
    hook means connected to said transducer for capturing a target fish attracted to said audio recording.

2. The audio fishing lure system as recited in claim 1 wherein said bait species is shrimp.

3. The audio fishing lure system as recited in claim 1 wherein said bait species is selected from the group consisting of shrimp, distressed fish and winged insects.

4. The audio fishing lure system as recited in claim 1 including a connecting line between said hook means and said transducer.

5. The audio fishing lure system as recited in claim 4 wherein a weight is attached to said connecting line.

6. The audio fishing lure system as recited in claim 4 wherein said hook means are connected to said connecting line by leader lines.

7. The audio fishing lure system as recited in claim 4 wherein an artificial lure including said hook means is attached to said connecting line.

8. A method for attracting target species fish comprising:
    providing a fishing pole having a fishing line extending therefrom with an outer end disposed in a water environment;
    providing audio sounds of a bait species attractive to the target species fish as an audio signal from an audio source adjacent the fishing pole;
    providing an encoder extending from an outer end of said pole having a sound pressure wave converter electrically connected and responsive to said audio source;
    acoustically coupling the encoder with said fishing line;
    modulating said fishing line with said encoder by inducing vibrations in said fishing line in response to said audio sounds;
    providing a transducer connected with said outer end of said fishing line disposed within the water environment for receiving said vibrations and converting and communicating said vibrations as audio signals of said bait species into said water environment;
    providing a tackle assembly including a hook connected to said transducer whereby the target species of fish are attracted adjacent said hook.

9. The method as recited in claim 8 wherein said bait species is shrimp.

10. The method as recited in claim 8 wherein said bait species is selected from the group consisting of shrimp, distressed fish, nuisance fish, and winged insects.

\* \* \* \* \*